United States Patent
Saez et al.

(10) Patent No.: US 11,878,409 B2
(45) Date of Patent: Jan. 23, 2024

(54) SYSTEM AND METHOD FOR CHANGING END-OF-ARM TOOLS

(71) Applicant: GM GLOBAL TECHNOLOGY OPERATIONS LLC, Detroit, MI (US)

(72) Inventors: Miguel Arturo Saez, Clarkston, MI (US); John Patrick Spicer, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 179 days.

(21) Appl. No.: 17/448,994

(22) Filed: Sep. 27, 2021

(65) Prior Publication Data

US 2023/0097672 A1 Mar. 30, 2023

(51) Int. Cl.
*B25J 15/04* (2006.01)
*B23Q 3/155* (2006.01)

(52) U.S. Cl.
CPC ......... *B25J 15/0491* (2013.01); *B23Q 3/1554* (2013.01); *B23Q 3/15526* (2013.01); *B23Q 2003/155414* (2016.11); *Y10S 483/901* (2013.01)

(58) Field of Classification Search
CPC ............ Y10T 483/18; Y10T 483/1873; Y10T 483/1882; Y10T 483/1748; Y10T 483/175; Y10T 483/1774; Y10T 483/179; Y10T 483/1793; Y10T 483/1795; Y10T 483/1891; Y10S 483/901; B25J 15/0491; B23Q 3/1554; B23Q 3/15526; B23Q 3/1572; B23Q 2003/155404; B23Q 2003/15541; B23Q 2003/15537

USPC ...... 483/58, 66, 67, 901, 36, 37, 47, 54, 55, 483/56; 211/70.6
See application file for complete search history.

(56) References Cited

U.S. PATENT DOCUMENTS

| | | | | |
|---|---|---|---|---|
| 3,805,965 A * | 4/1974 | Champagne | ............. | B25H 3/00 211/144 |
| 3,966,052 A * | 6/1976 | Knaus | ...................... | B25H 3/04 211/163 |
| 4,344,221 A * | 8/1982 | Pagani | ............... | B23Q 3/15539 483/8 |
| 4,543,636 A * | 9/1985 | Noda | ............... | G05B 19/41825 483/58 |
| 5,242,359 A * | 9/1993 | Obrist | ..................... | B23Q 7/10 409/230 |
| 5,304,110 A * | 4/1994 | Obrist | ............... | B23Q 3/15539 211/1.55 |

(Continued)

FOREIGN PATENT DOCUMENTS

| | | | | |
|---|---|---|---|---|
| EP | 2177310 B1 * | 3/2014 | ......... | B23Q 3/15526 |
| EP | 3372338 A1 * | 9/2018 | ......... | A61C 13/0004 |
| SU | 1364442 A * | 1/1988 | | |

*Primary Examiner* — Erica E Cadugan
*Assistant Examiner* — Michael Vitale
(74) *Attorney, Agent, or Firm* — Lorenz & Kopf LLP

(57) ABSTRACT

Systems and methods for changing end-of-arm tools and methods for manufacturing vehicles are provided. An exemplary end-of-arm tool changing system includes a rotatable tool rack configured to hold at least two end-of-arm tools and configured to move a selected end-of-arm tool from a far location to a near location. The exemplary end-of-arm tool changing system further includes a robot configured to reach the near location for attachment of the selected end-of-arm tool to the robot.

16 Claims, 4 Drawing Sheets

(56) References Cited

U.S. PATENT DOCUMENTS

| | | | | |
|---|---|---|---|---|
| 7,584,973 B2 * | 9/2009 | Brager | ................... | B25H 3/026 |
| | | | | 248/404 |
| 7,744,514 B2 * | 6/2010 | Rossinger | .............. | B62D 65/02 |
| | | | | 228/49.1 |
| 8,132,306 B2 * | 3/2012 | Kipping | ............... | B23K 37/047 |
| | | | | 228/49.1 |
| 2007/0258797 A1 * | 11/2007 | Gordon | ................... | B23P 21/00 |
| | | | | 414/276 |
| 2013/0273815 A1 * | 10/2013 | Schneider | ........... | B24B 13/0055 |
| | | | | 451/8 |

* cited by examiner

SYSTEM AND METHOD FOR CHANGING END-OF-ARM TOOLS

INTRODUCTION

The technical field generally relates to assembly systems and methods within a manufacturing plant, and more particularly to vehicle assembly systems and methods that utilize robots with exchangeable end-of-arm tools or end effectors.

Multi-axis industrial robots include articulated arms connected via joints. Each arm segment is driven via one or more joint motors. Typical industrial robots are controlled with respect to six different control axes. Collectively, the control axes enable rotation of the robot with respect to a fixed or mobile base, extension/retraction of a first arm, and raising/lowering of a second arm, as well as joint rotation and rotation/translation of a wrist disposed at a distal end of the second arm. Additional arms may be used in a serial arrangement depending on the design. An end-of-arm tool, or end effector, connected to the wrist may be manipulated to perform a desired work task.

The terms "end-of-arm tool" or "end effector" are synonymous and refer to the particular end linkages or segments that, depending on the design of the robot, can securely grip, transport, orient, and release a workpiece or component. End-of-arm tools include gripping tools, welding tongs, vacuum grippers, clamping devices, adhesive and sealant applicators, and other similar devices.

After completing a task, an assembly process may call for changing the end-of-arm tool on a robot so that the robot may perform a next task. Tool changers may be used to replace an attached end-of-arm tool with the next needed end-of-arm tool. A typical tool changer includes a robot-side plate that is attached to the robot arm and a tool-side plate that is attached to the end-of-arm tool. To attach an end-of-arm tool, these plates are coupled together.

Typically, a tool rack may be used to hold an end-of-arm tool and facilitate the mounting and dismounting of the end-of-arm tool to and from a robot. For example, a dismounting may occur when the robot directs a mounted end-of-arm tool into the rack, the rack engages the end-of-arm tool, the robot actuates a latch mechanism to release the end-of-arm tool from the robot, and the robot arm moves away from the end-of-arm tool. Mounting an end-of-arm tool reverses this process, as the robot moves to match the robot-side plate of the tool changer device to a tool-side plate attached to a desired end-of-arm tool, the robot actuates the latch mechanism, the rack releases the end-of-arm tool, and the robot moves the end-of-arm tool out of the rack.

With the operation of multiple robots at an assembly station, space is limited. Accordingly, it is desirable to provide systems and methods for changing end-of-arm tools that reduce the dedicated tool changing footprint. In addition, it is desirable to provide systems and methods for manufacturing vehicles assembling in which an active or passive tool indexing capability is provided for tool changing for multiple robots. Furthermore, other desirable features and characteristics of embodiments will become apparent from the subsequent detailed description and the appended claims, taken in conjunction with the accompanying drawings and the foregoing technical field and background.

SUMMARY

Systems and methods for changing end-of-arm tools and methods for manufacturing vehicles are provided. An exemplary end-of-arm tool changing system includes a tool rack configured to hold at least two end-of-arm tools and configured to move a selected end-of-arm tool from a far location to a near location. The exemplary end-of-arm tool changing system further includes a robot configured to reach the near location for attachment of the selected end-of-arm tool to the robot.

In certain embodiments, the robot is configured to selectively rotate the tool rack to move the selected end-of-arm tool to the near location for attachment of the selected end-of-arm tool to the robot. In such embodiments, the tool rack may be unpowered, such that it need not be connected to a power source. Further, in such embodiments, the tool rack and the robot may be formed with mating couplings to allow the robot to selectively rotate the tool rack. In particular, the mating coupling may be formed on a shaft of the tool rack.

In certain embodiments, the system further includes a driver in mechanical connection with the tool rack to rotate the tool rack to move the selected end-of-arm tool from the far location to the near location for attachment of the selected end-of-arm tool to the robot. In such embodiments, the tool rack may be powered.

In certain embodiments, the tool rack includes a shaft and the system further includes an encoder coupled to the shaft, and a servo-motor and gearbox coupled to the encoder.

In certain embodiments, the robot has a maximum reach, and the far location is outside of the maximum reach of the robot.

In certain embodiments, the system further includes a vehicle configured for moving and for selectively anchoring at a fixed position, and the tool rack is mounted on the vehicle.

In certain embodiments, the tool rack rotates about an axis; the tool rack has a first tool mount for holding a first end-of-arm tool and a second tool mount for a second end-of-arm tool; and the axis is located between the first tool mount and the second tool mount.

In certain embodiments, the robot is a first robot, and the system further includes a second robot configured to reach the far location for attachment of a second end-of-arm tool to the second robot.

In certain embodiments, the robot is a first robot, the system further includes a second robot, and the tool rack is located between the first robot and the second robot.

In another exemplary embodiment, a method for changing an end-of-arm tool is provided. The method for changing an end-of-arm tool includes locating an end-of-arm tool on a rotatable tool rack, rotating the tool rack to move the end-of-arm tool to a selected location, and reaching the end-of-arm tool with a robot and attaching the end-of-arm tool to the robot.

In certain embodiments of the method, rotating the tool rack to move the end-of-arm tool to the selected location is performed by the robot.

In certain embodiments of the method, rotating the tool rack to move the end-of-arm tool to the selected location is performed by a driver in mechanical connection with the rotatable tool rack.

In certain embodiments, the method further includes locating the rotatable tool rack on a vehicle; moving the vehicle into an assembly cell; and anchoring the vehicle at a fixed position in the assembly cell.

In certain embodiments of the method, the robot is a first robot and the end-of-arm tool is a first end-of-arm tool, and the method further includes locating a second end-of-arm tool on the rotatable tool rack, rotating the tool rack to move the second end-of-arm tool to a second selected location, and reaching the second end-of-arm tool with a second robot and attaching the second end-of-arm tool to the second robot.

In certain embodiments, the system further includes a camera configured to identify a position of the tool rack and/or a selected end-of-arm tool to enable alignment of the robot and the tool rack and/or selected end-of-arm tool.

In another exemplary embodiment, a method for manufacturing a vehicle is provided and includes locating an end-of-arm tool on a rotatable tool rack, rotating the tool rack to move the end-of-arm tool to a selected location, reaching the end-of-arm tool with a robot and attaching the end-of-arm tool to the robot, and grasping a component with the end-of-arm tool and performing an assembly operation.

In certain embodiments of the method, rotating the tool rack to move the end-of-arm tool to the selected location is performed by the robot.

In certain embodiments of the method, rotating the tool rack to move the end-of-arm tool to the selected location is performed by a driver in mechanical connection with the rotatable tool rack.

In certain embodiments, the method further includes locating the rotatable tool rack on a vehicle, moving the vehicle into an assembly cell, and anchoring the vehicle at a fixed position in the assembly cell.

In certain embodiments, the end-of-arm tool is a first end-of-arm tool and the robot is a first assembly robot, and the method further includes locating a second end-of-arm tool on the rotatable tool rack, rotating the tool rack to move the second end-of-arm tool to a second selected location, reaching the second end-of-arm tool with a second assembly robot and attaching the second end-of-arm tool to the second assembly robot, grasping, with the first assembly robot, a first component, grasping, with a second assembly robot, a second component, moving the first component and/or the second component to align the first component and the second component for joining, and fastening the first component to the second component to form a joined component.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising." In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated.

The figures are in simplified schematic form and are not to precise scale. Further, terms such as "upper", "lower", "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. It is noted that while embodiments may be described herein with respect to automotive applications, those skilled in the art will recognize their broader applicability.

Embodiments herein are related to the assembly of components, such as for the manufacture of vehicles. Exemplary components may be body panels for the body of a vehicle. In exemplary embodiments, a reconfigurable body assembly system and method sets the geometry of multiple body panels or components relative to each other. During assembly, a first robot uses a selected end-of-arm tool and a second robot uses another selected end-of-arm tool to perform an assembly operation on one or more components to form a sub-assembly. This process is repeated with same or different end-of-arm tools to join the desired number of components together.

Figure 1:
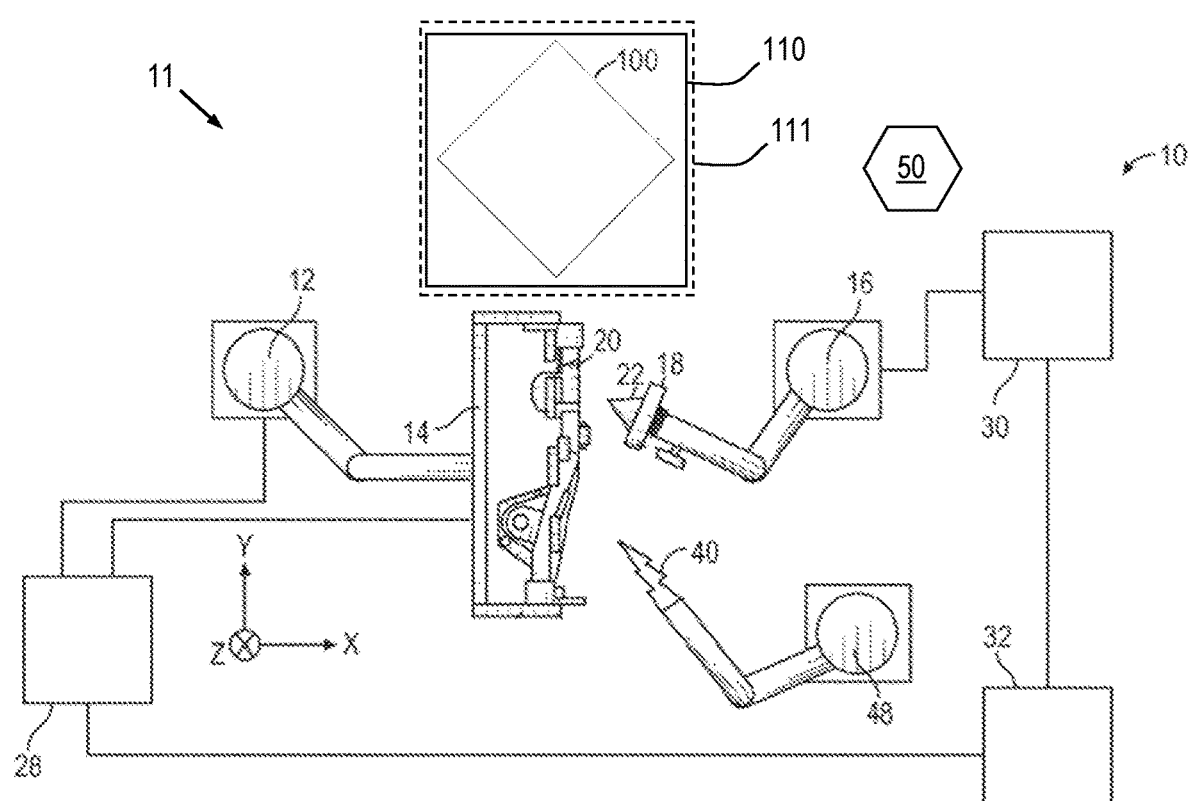
FIG. 1 is a schematic illustration of a system for changing end-of-arm tools, in accordance with various embodiments.

FIG. 1 is a basic diagram of an exemplary embodiment of a system 10 for changing end-of-arm tools, such as for manufacture of a vehicle. As shown, the exemplary system 10 is located at an assembly station or cell 11 that includes a first robot 12 with a first end-of-arm tool 14 mounted thereon, a second robot 16 with a second end-of-arm tool 18 mounted thereon. The first end-of-arm tool 14 is adapted to grasp a primary component 20 and hold the primary component 20 during the assembly process. The second end-of-arm tool 18 is adapted to grasp a secondary component 22 and hold the secondary component 22 during the assembly process.

The primary and secondary components 20, 22 may be, as a non-limiting example, a panel configured as a decklid or liftgate for an automotive vehicle. Alternatively, the primary and secondary components 20, 22 may be an aircraft fuselage panel, a door panel for a consumer appliance, an armrest for a chair, or any other subcomponent configured to be joined or attached to another subcomponent. The primary and secondary components 20, 22 may be formed from any suitable material, such as, metal, plastic, a composite, and the like. The primary and secondary components 20, 22 as shown in the exemplary embodiment of FIG. 1 are vehicle frame components for an automobile. More specifically, the primary component 20 is a vehicle frame and the secondary component 22 is a subcomponent such as a bracket that is attached to the primary component 20.

Each of the first and second robots 12, 16 may be a programmable mechanical arm; may include hand, wrist, elbow, and shoulder portions (not shown); and may be remotely-controlled by pneumatics and/or electronics. The first and second robots 12, 16 may be, as non-limiting examples, a six-axis articulated robot arm, a Cartesian robot arm, a spherical or polar robot arm, a selective compliance assembly robot arm, and the like. In one non-limiting example, the first and second robots 12, 16 may be a six-axis articulated robot arm.

A first controller 28 is adapted to control movements of the first robot 12 and a second controller 30 is adapted to control movements of the second robot 16. The first and second system controllers 28, 30 are a non-generalized, electronic control devices having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The first controller 28 moves the first robot 12 and actuates the first end-of-arm tool 14 to control the position of the primary component 20. The second controller 30 moves the second robot 16 and actuates the second end-of-arm tool 18 to control the position of the secondary component 22. Movement of the first and second robots 12, 16 by the first and second controllers 28, 30 is based on executable code stored in memory or provided to the controllers 28, 30. A robot-to-robot communication architecture 32 interconnects the first controller 28 and the second controller 30. The robot-to-robot communication architecture 32 allows the first and second robots 12, 16 to communicate with one another and share information that the first and second controllers 28, 30 use to coordinate movement of the primary and secondary components 20, 22.

The first and second robots 12, 16 are adapted to be controlled by the first and second controllers 28, 30 based either on position control or force control. When the system controllers 28, 30 use position control, the first and second robots 12, 16 are controlled based on the three-dimensional position of the first and second robots 12, 16 within the work space of the system 10. When using position control, the first and second robots 12, 16 are controlled to keep them in a specific position. When the system controllers 28, 30 use force control, the first and second robots 12, 16 are controlled based on force feedback measured by the force gauges.

The first and second controllers 28, 30 can be controlled using force control, wherein once the primary component 20 and the secondary component 22 are in contact, the first and second controllers 28, 30 will use feedback from force gauges to maintain contact between the primary and secondary components 20, 22 at a pre-determined force. The first and second controllers 28, 30 can also vary the force measured between the primary and secondary components 20, 22 based on a pre-determined force schedule.

In certain embodiments, the system 10 includes a joining robot 48 with a joining tool 40 mounted thereon. The joining tool 40 is adapted to join the primary and secondary components 20, 22. The joining robot 48 is controlled to bring the joining tool 40 near or into engagement with the primary and secondary components 20, 22. The joining robot 48 may be a programmable mechanical arm, may include hand, wrist, elbow, and shoulder portions (not shown), and may be remotely-controlled by pneumatics and/or electronics. The joining robot 48 may be, as non-limiting examples, a six-axis articulated robot arm, a Cartesian robot arm, a spherical or polar robot arm, a selective compliance assembly robot arm, and the like. In one non-limiting example, the joining robot arm 48 may be a six-axis articulated robot arm.

It should be understood that the joining tool 40 can be any type of joining tool appropriate for joining subcomponents of different materials and characteristics. In the exemplary embodiment shown in FIG. 1, the joining tool 40 is a welding tool adapted to create a welded attachment of the primary and secondary components 20, 22.

As further shown, the system 10 includes a rotatable tool rack 100. An exemplary rotatable tool rack 100 is configured to hold at least two end-of-arm tools, such as two, three, four, or any other suitable number of end-of-arm tools. In exemplary embodiments, the rotatable tool rack 100 is provided to change the tools of the first robot 12 and second robot 16. Therefore, the rotatable tool rack 100 is positioned between the first robot 12 and the second robot 16. As used herein, "between" may refer to "indirectly between" wherein the rotatable tool rack 100 is both located nearer to the first robot 12 than the second robot 16 is and located nearer to the second robot 16 than the first robot 12 is; and "directly between" wherein a line from the first robot 12 to the second robot 16 passes through the rotatable tool rack 100.

In exemplary embodiments, the rotatable tool rack 100 is mounted on an unmanned vehicle system 110. The unmanned independent vehicle system 110 may be or include one or more of the following: an automated guided vehicle (AGV), an automated guided cart (AGC), a laser guided vehicle (LGV), a vision guided vehicle (VGV), an autonomous vehicle (AV), any other wheeled vehicle, and/or a drone. In some examples, each unmanned independent vehicle system 110 includes an unmanned and self-propelled robotic vehicle that is used to transport a part along a route that can be either pre-defined or determined in real-time by the unmanned independent vehicle system 110 itself. The unmanned independent vehicle system 110 may utilize one or more controllers, optical sensors, distance sensors, global positioning system(s) (GPS), and/or laser guidance for navigation, by way of example. The navigation system can dictate a precise path for the unmanned independent vehicle system 110 to travel and provide real-time path adjustments for anything that encroaches upon the travel path of the unmanned independent vehicle system 110. In some examples, each unmanned independent vehicle system 110 may generally be autonomous in its navigation of a route or segment to a destination, in contrast to a defined or dedicated path.

In exemplary embodiments, a selected unmanned vehicle system 110 docks or anchors itself at a fixed position 111 in the assembly station 11. Each unmanned vehicle system 110 and the fixed position 111 may include mating features to allow for repeated accurate placement of the unmanned vehicle system 110 at the fixed position 111. If the rotatable tool rack 100 is unpowered during use, the connection between the unmanned vehicle system 110 and the assembly station 11 may be only mechanical. If the rotatable tool rack 100 is powered, there may be a mechanical and electrical connection between the unmanned vehicle system 110 and the assembly station 11.

It is noted that the exemplary system 10 may further include a camera 50 or cameras 50, in order to identify the precise position (location and orientation) of the tool rack 100 and/or tool mounts or tool holders thereon in order to enable precise alignment of the robot 12, 16 to the tool rack 100 and/or tool mount or holder (or end-of-arm tool located thereon). The camera 50 may be mounted at a fixed position with respect to the robot 12, 16, such as above the tool rack 100 to allow the position of the tool rack 100 and/or tool mount or holder (or end-of-arm tool located thereon) to be precisely determined with respect to the camera 50 and robot 12, 16. In this system, the tool rack 100 can be brought to the assembly cell on a mobile unit that is placed approximately in position near the robot 12, 16. As long as the tool rack 100 has visual reference points that are within the field of view of the camera 50, the camera 50 can determine the precise position of the tool rack 100 and/or tool mount or holder (or end-of-arm tool located thereon), and therefore enable proper alignment between the robot 12, 16 and the tool rack 100 for indexing, and the tool mount or holder (or end-of-arm tool located thereon) for picking up or dropping off an end-of-arm tool. Alternatively, the camera 50 or an additional camera 50 may be mounted on the robot 12, 16 itself to identify the precise position (location and orientation) of the tool rack 100 and/or tool mounts or tool holders (or end-of-arm tools) thereon in order to enable precise alignment of the robot 12, 16 to the tool rack 100 and/or tool mount or holder (or end-of-arm tools located thereon).

Figure 2:
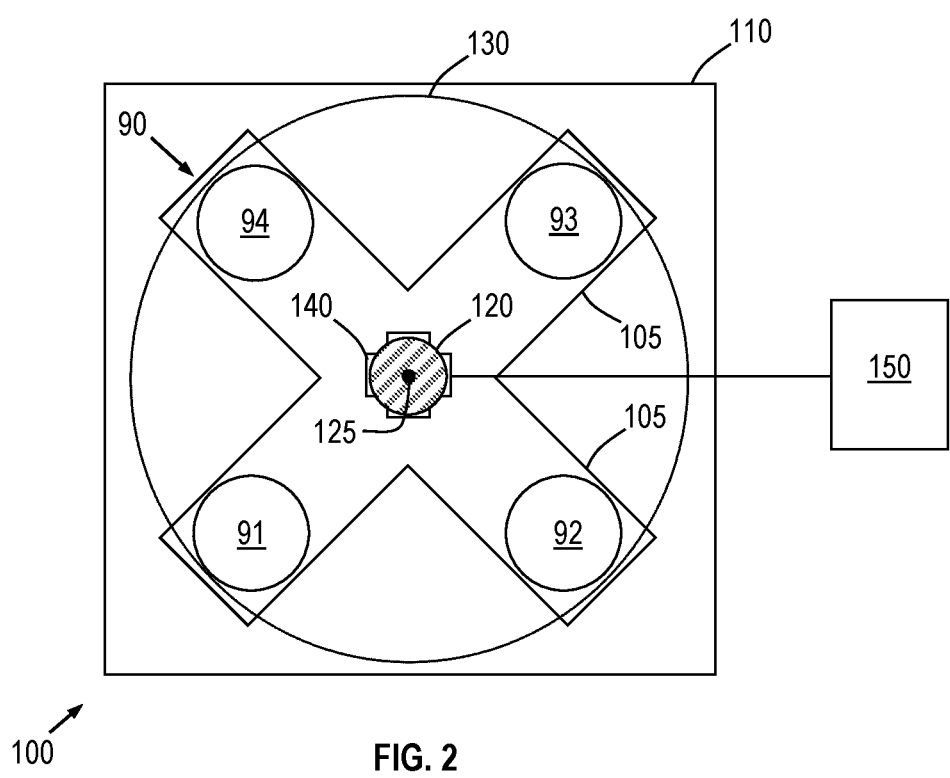
FIG. 2 is a schematic illustration of a tool rack used in the system for changing end-of-arm tools of FIG. 1, in accordance with various embodiments.

FIG. 2 is a schematic overhead drawing of an exemplary rotatable tool rack 100. As shown, the rotatable tool rack 100 includes a shaft 120 defining an axis 125 about which the rotatable tool rack 100 may rotate. Further, the exemplary rotatable tool rack 100 may include a structure 105 for holding end-of-arm tools at tool mounts or stations 90. In the illustration, the structure 105 is formed as a pair of intersecting arms, though the structure may be formed as a tray or with any other suitable design. As illustrated, the rotatable tool rack 100 includes four tool mounts or stations 90, identified as first tool mount 91, second tool mount 92, third tool mount 93, and fourth tool mount 94, for holding four end-of-arm tools. As shown, each tool mount 90 is distanced from the shaft 120 such that rotating the rotatable tool rack 100 changes the location of each tool mount 90. When rotated, a tool located at any tool mount 90 travels along the circumference identified by dashed line 130.

Figure 3:
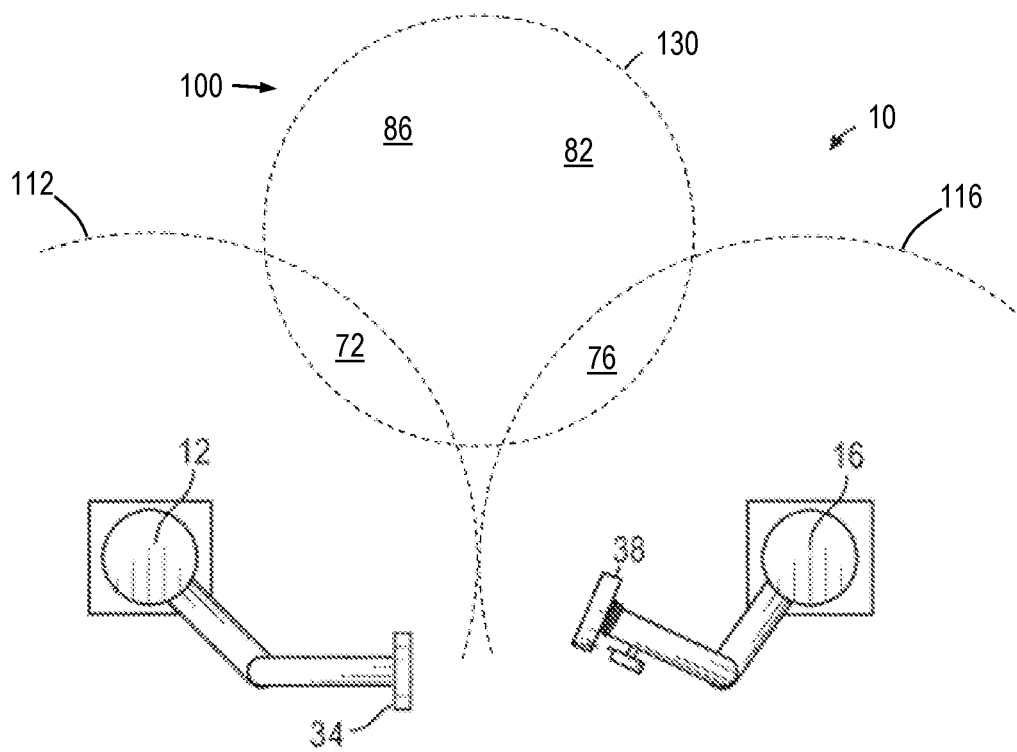
FIG. 3 is a schematic illustration illustrating the interaction of two robots and the tool rack of FIG. 1, in accordance with various embodiments.

FIG. 3 is a schematic illustrating the spatial relationship between the rotatable tool rack 100 and the first robot 12 and second robot 16. As shown, the first robot 12 has a maximum reach 112 defined by the full extension of its robot arm, including the robot-side plate 34, and the second robot 16 has a maximum reach 116 defined by the full extension of its robot arm, including the robot-side plate 38.

As illustrated, tools located on the rotatable tool rack 100 rotate along the path 130. As shown, the first robot 12 can reach a tool located in a near location 72 located within maximum reach 112 but cannot reach a tool located in a far location 82, located outside maximum reach 112. Similarly, the second robot 16 can reach a tool located in a near location 76 located within maximum reach 116 but cannot reach a tool located in a far location 86, located outside maximum reach 116.

Cross-referencing FIGS. 2 and 3, it may be seen that selective rotation of the rotatable tool rack 100 allows each robot 12 and 16 to reach each tool mount 91-94 on the rotatable tool rack, so that every tool store thereon can be reached and is available to each robot 12 and 16.

In certain embodiments, the rotatable tool rack 100 is unpowered and rotates as a result of a force applied by a robot. In an embodiment, one selected robot may rotate the rotatable tool rack 100. In another embodiment, either robot may rotate the rotatable tool rack 100. In either case, the rotatable tool rack and the robot have mating couplings to allow the robot to selectively rotate the rotatable tool rack. For example, the robot may use a tool that mates with a coupling 140 formed on the shaft 120 (as shown) or on the structure 105.

In other words, at least one robot is configured to selectively rotate the rotatable tool rack 100 to move a selected end-of-arm tool to a near location for attachment of the selected end-of-arm tool to a selected robot.

In certain embodiments, the rotatable tool rack 100 is self-powered and includes a mechanical connection to a driver 150 to rotate the rotatable tool rack 100. In such an embodiment, the rotatable tool rack 100 may include an encoder coupled to the shaft and a servo-motor and gearbox coupled to the encoder. The driver 150 may be activated to rotate the rotatable tool rack 100 to move a selected end-of-arm tool from a far location to a near location for attachment of the selected end-of-arm tool to a selected robot.

Figure 4:
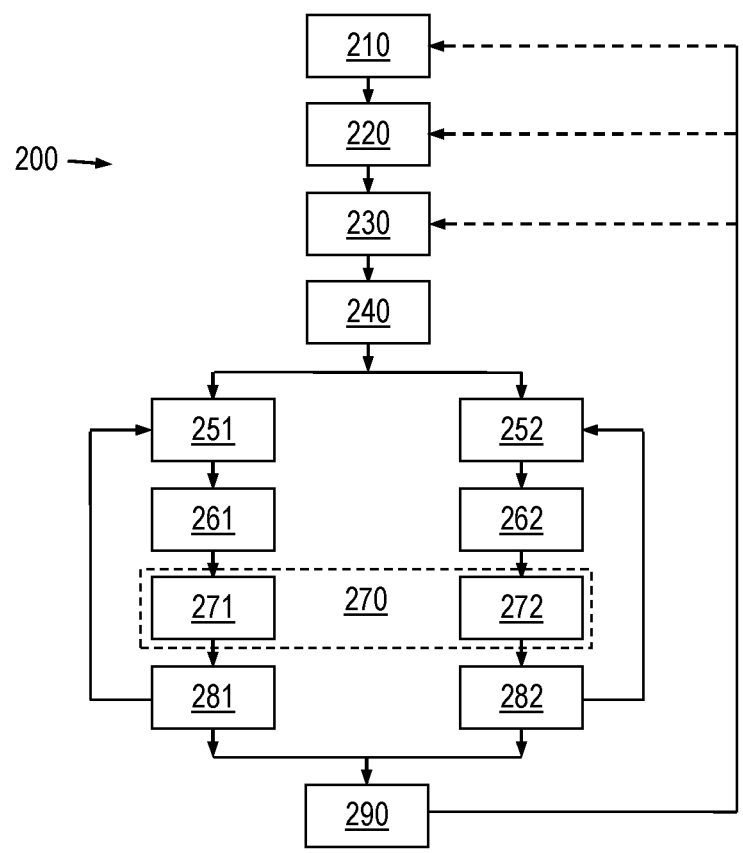
FIG. 4 is a flow chart illustration of a method for manufacturing a vehicle, including changing end-of-arm tools, in accordance with various embodiments.

FIG. 4 provides a flow chart of a method 200 for manufacturing a vehicle, including for changing an end-of-arm tool. The method 200 includes locating an end-of-arm tool on a rotatable tool rack at action block 210. The tool may be mounted, hung, or otherwise positioned at a tool mount on the rotatable tool rack. In an exemplary embodiment a family of tools, i.e., tools that are used in succession, may be grouped together and mounted on the tool rack. Further, in an exemplary embodiment, tools to be used by more than one robot are grouped together and mounted on the tool rack.

In certain embodiments, the rotatable tool rack may be located on a movable vehicle at action block 220. While shown succeeding action block 210, it is envisioned that actions 210 and 220 may be performed in either order in method 200.

Method 200 may further include moving the vehicle into an assembly cell at action block 230, and anchoring the vehicle at a fixed position in the assembly cell at action block 240.

Further, method 200 includes rotating the tool rack to move the end-of-arm tool to a selected location at action block 251. This action may be performed by a robot which contacts the tool rack and forces the tool rack to rotate about its axis. Alternatively, the tool rack may be self-powered and may be activated to rotate to a desired orientation, such as by a driver in mechanical connection with the rotatable tool rack.

Method 200 may continue with reaching the end-of-arm tool with a robot and attaching the end-of-arm tool to the robot at action block 261; and with grasping a component with the end-of-arm tool and performing an assembly operation at action block 271. Thereafter, at action block 281, the method may proceed with replacing the end-of-arm tool at the tool rack. Then, actions 251-281 may be repeated as long as the necessary tools are located on the tool rack. When a tool rack with different tools is needed, method 200 includes moving the vehicle out of the assembly cell at action block 290. Then, the method 200 may repeat beginning at action 210, 220, or 230.

It is contemplated that parallel actions be performed for multiple robots sharing the tool rack. For example, the method may include at action block 252, rotating the tool rack to move a second end-of-arm tool to a second selected location. It is understood, that action 251 may include performing action 252 in certain embodiments. Method 200 may include reaching the second end-of-arm tool with a second robot and attaching the second end-of-arm tool to the second robot at action block 262; and grasping a second component with the second end-of-arm tool and performing an assembly operation at action block 272. The assembly operations 271 and 272 may be a common operation 270, and may include moving the components into alignment for joining and fastening the components together to form a joined component. Thereafter, at action block 282, the method may proceed with replacing the second end-of-arm tool at the tool rack. Actions 252-282 may be repeated as long as the necessary tools are located on the tool rack. When a tool rack with different tools is needed, method 200 includes moving the vehicle out of the assembly cell at action block 290. Then, the method 200 may proceed beginning at action 210, 220, or 230, or end if the manufacturing process is completed at the assembly cell. While FIG. 4 illustrates processing with two robots, it is contemplated that more than two robots may utilize tools from the tool rack.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An end-of-arm tool changing system, the system comprising:
    a tool rack configured to hold at least two end-of-arm tools and configured to move a first end-of-arm tool from a far location to a near location;
    a first robot arm configured to reach the near location for attachment of the first end-of-arm tool to the robot arm, wherein the first robot arm is configured to selectively rotate the tool rack to move the first end-of-arm tool to the near location for attachment of the first end-of-arm tool to the first robot;
    a second robot arm configured to reach the far location for attachment of a second end-of-arm tool to the second robot arm, and
    a vehicle configured for moving and for selectively anchoring at a first fixed position, wherein the tool rack is mounted on a vehicle, and wherein the fixed position is located between the first robot arm and the second robot arm.

2. The system of claim 1 wherein the first robot arm is configured to selectively rotate the tool rack to move the second end-of-arm tool to the far location for attachment of the second end-of-arm tool to the second robot arm.

3. The system of claim 2
    wherein the tool rack includes a coupling, and
    wherein the first robot arm includes a tool that mates with the coupling to allow the first robot arm to selectively rotate the tool rack.

4. The system of claim 1 wherein the first robot arm has a maximum reach, and wherein the far location is outside of the maximum reach of the first robot arm.

5. The system of claim 1
    wherein the vehicle is an unmanned and self-propelled robotic vehicle, and
    wherein the vehicle includes a mating feature configured for repeated accurate placement of the vehicle at the fixed position and for anchoring at the fixed position.

6. The system of claim 1 wherein:
    the tool rack rotates about an axis;
    the tool rack has a first tool mount for holding the first end-of-arm tool and a second tool mount for holding the second end-of-arm tool; and
    the axis is located between the first tool mount and the second tool mount.

7. The system of claim 1 wherein the tool rack is located directly between the first robot arm and the second robot arm.

8. The system of claim 1 further comprising a camera configured to identify a position of the tool rack and/or the first end-of-arm tool to enable alignment of the first robot arm with the tool rack and/or the first end-of-arm tool.

9. A method for changing an end-of-arm tool with the end-of-arm tool changing system of claim 1, the method comprising:
    providing the end-of-arm tool changing system of claim 1;
    moving the vehicle to the fixed position;
    selectively anchoring the vehicle at the fixed position;
    rotating the tool rack with the first robot arm to move the first end-of-arm tool to the near location;
    reaching the first end-of-arm tool with the first robot arm and attaching the first end-of-arm tool to the first robot arm;
    rotating the tool rack with the first robot arm to move the second end-of-arm tool to the far location; and
    reaching the second end-of-arm tool with the second robot arm and attaching the second end-of-arm tool to the second robot arm.

10. The method of claim 9 wherein the fixed position is located directly between the first robot arm and the second robot arm.

11. The method of claim 9
    wherein the vehicle is an unmanned and self-propelled robotic vehicle, and
    wherein the vehicle includes a mating feature configured for repeated accurate placement of the vehicle at the fixed position and for anchoring at the fixed position.

12. The method of claim 9,
    wherein the tool rack includes a coupling, and
    wherein the first robot arm includes a tool that mates with the coupling to allow the first robot arm to selectively rotate the tool rack.

13. A method for manufacturing a vehicle utilizing an assembly station and the end-of-arm tool changing system of claim 1, the method comprising:
    providing the end-of-arm tool changing system of claim 1;
    moving the vehicle to the fixed position;

selectively anchoring the vehicle at the fixed position;

rotating the tool rack with the first robot arm to move the first end-of-arm tool to the near location;

reaching the first end-of-arm tool with the first robot arm and attaching the first end-of-arm tool to the first robot arm;

rotating the tool rack with the first robot arm to move the second end-of-arm tool to the far location; and reaching the second end-of-arm tool with the second robot arm and attaching the second end-of-arm tool to the second robot arm;

grasping a first component with the first end-of-arm tool, and performing an assembly operation with the assembly station in which the grasped first component is joined to a second component.

14. The method of claim 13 wherein the fixed position is located directly between the first robot arm and the second robot arm.

15. The method of claim 13 wherein the vehicle is an unmanned and self-propelled robotic vehicle, and wherein the vehicle includes a mating feature configured for repeated accurate placement of the vehicle at the fixed position and for anchoring at the fixed position.

16. The method of claim 13 wherein the method further comprises:

grasping, with the second robot arm, the second component;

moving the first component and/or the second component to align the first component and the second component for joining; and fastening the first component to the second component to form a joined component.

* * * * *